(12) United States Patent
Lee et al.

(10) Patent No.: US 10,181,210 B2
(45) Date of Patent: Jan. 15, 2019

(54) METHOD AND DEVICE FOR DISPLAYING BACKGROUND IMAGE

(71) Applicant: Samsung Electronics Co., Ltd., Suwon-si, Gyeonggi-do (KR)

(72) Inventors: Hee Sae Lee, Yongin-si (KR); Kee Chang Lee, Seongnam-si (KR); Hyong Euk Lee, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 273 days.

(21) Appl. No.: 14/814,709

(22) Filed: Jul. 31, 2015

(65) Prior Publication Data

US 2016/0048988 A1     Feb. 18, 2016

(30) Foreign Application Priority Data

Aug. 18, 2014   (KR) .................. 10-2014-0107087

(51) Int. Cl.
*G06T 11/60*     (2006.01)
*G06T 13/80*     (2011.01)

(52) U.S. Cl.
CPC ............. *G06T 11/60* (2013.01); *G06T 13/80* (2013.01)

(58) Field of Classification Search
CPC ............................... G06T 11/60; G06T 13/80
See application file for complete search history.

(56) References Cited

U.S. PATENT DOCUMENTS

| 5,638,499 | A  | * | 6/1997  | O'Connor ............... G06T 15/50 |
|           |    |   |         | 345/419 |
| 9,367,203 | B1 | * | 6/2016  | Costello ............. G06F 3/04815 |
| 2009/0017870 | A1 | * | 1/2009 | An .................... H04M 1/72572 |
|           |    |   |         | 455/565 |
| 2011/0007086 | A1 | * | 1/2011 | Kim ....................... G06T 11/001 |
|           |    |   |         | 345/581 |
| 2013/0147826 | A1 | * | 6/2013 | Lamb ..................... G09G 3/003 |
|           |    |   |         | 345/589 |
| 2015/0077591 | A1 | * | 3/2015 | Fujiwara ............ H04N 5/23216 |
|           |    |   |         | 348/234 |
| 2015/0145773 | A1 | * | 5/2015 | Ito ......................... G06F 3/0346 |
|           |    |   |         | 345/158 |
| 2015/0294649 | A1 | * | 10/2015 | Imamura ................. G09G 5/36 |
|           |    |   |         | 345/641 |
| 2016/0125633 | A1 | * | 5/2016 | Windmark ........... G06T 3/4038 |
|           |    |   |         | 382/103 |

FOREIGN PATENT DOCUMENTS

| KR | 20100124397 A | 11/2010 |
| KR | 20130079750 A | 7/2013 |
| KR | 20130127303 A | 11/2013 |
| KR | 20140021406 A | 2/2014 |
| KR | 20140021413 A | 2/2014 |

\* cited by examiner

*Primary Examiner* — Jwalant Amin
(74) *Attorney, Agent, or Firm* — Harness, Dickey & Pierce, P.L.C.

(57) ABSTRACT

At least some example embodiments disclose a method and device for displaying a background image that may change an arrangement of an object based on image information associated with the background image and change a visual effect with respect to an adjacent region of the object.

5 Claims, 17 Drawing Sheets

METHOD AND DEVICE FOR DISPLAYING BACKGROUND IMAGE

CROSS-REFERENCE TO RELATED APPLICATION

This application claims the priority benefit of Korean Patent Application No. 10-2014-0107087, filed on Aug. 18, 2014, in the Korean Intellectual Property Office, the entire disclosure of which is incorporated herein by reference.

BACKGROUND

1. Field

At least some example embodiments of the following description relate to a method and device for displaying a background image.

2. Description of the Related Art

Recent electronic devices may provide an option to display a background image. For example, a user may select a desired image and may use the desired image as a background image to be displayed in the background of a portable electronic device.

The image used as the background image may be an image that a user photographs through a camera attached to an electronic device, or may be an externally acquired image that the user stores on the electronic device. For example, the electronic device may provide a function through which the user freely changes background images using existing images or images photographed by the user. When the user uses the photographed images, many electronic devices may provide a function to select a specific image and a specific region in the image to be designated as a background image.

Also, the electronic device may display objects, such as an icon and a widget, on a background image. Here, a region that the user desires to reveal in the photographed image may be obscured by the icon or the widget. Thus, the user may relocate the objects randomly with respect to the background image.

SUMMARY

At least one example embodiment discloses a device for displaying a background image, the device including a display configured to display an object and the background image, and a processor configured to instruct the display to display a visual effect by a virtual light source at an adjacent region of the object based on the background image.

The processor may be configured to set the virtual light source based on image information associated with the background image.

The processor may be configured to extract a color of the virtual light source from a location corresponding to the virtual light source in the background image, and to instruct the display to display the visual effect using the extracted color.

The processor may be configured to instruct the display to display a shadow formed by the virtual light source in the adjacent region of the object.

The processor may be configured to determine a color of the visual effect based on at least one of a color of the virtual light source and a color of light reflected by the object from the virtual light source.

The processor may be configured to designate a location of the virtual light source to be on a virtual layer at a predetermined and/or desired distance spaced apart from an object layer and the object layer includes the object.

When the background image includes a plurality of frames, the processor may be configured to play a plurality of frames continuously and to change the visual effect by the virtual light source with respect to the adjacent region of the object for each frame.

The processor may be configured to maintain the visual effect with respect to the object and to change the visual effect with respect to the adjacent region of the object based on the virtual light source.

At least one example embodiment discloses a device for displaying a background image, the device including a display and a processor configured to instruct the display to display at least one object and the background image through the display, to change a location of the object from a first region in the background image to a second region in the background image, and to display the second region reflecting a first visual effect.

The processor may be configured to determine a partial region of the background image as the first region based on image information associated with the background image.

The processor may be configured to identify a region of interest (ROI) from the background image and to determine a region including the identified ROI as the first region.

The processor may be configured to determine a level of the first visual effect with respect to the second region based on a distance from the first region to the second region.

The processor may be configured to determine a level of the first visual effect with respect to the second region based on an arrangement of the object in the second region.

The processor may be configured to display the first region reflecting a second visual effect distinguished from the first visual effect.

At least one example embodiment discloses a device for displaying a background image, the device including a camera configured to continuously supply an external image, a display, and a processor configured to instruct the display to display the external image and to change an arrangement of at least one object overlaid on the external image in response to the external image.

The processor may be configured to identify a first region from the external image based on image information associated with the external image, and to change a location of the object from the first region to a second region in real time.

The processor may be configured to store the external image as the background image.

The processor may be configured to determine a region including a region of interest (ROI) from the external image as the first region and to determine a remaining region distinguished from the first region in the external image as the second region.

The processor may be configured to set a virtual light source with respect to the external image based on image information associated with the external image and to instruct the display to display an adjacent region of each of the at least one object reflecting a light source effect by the virtual light source.

The processor may be configured to store the external image as the background image in response to a control signal of a user and to instruct the display to display the stored external image through the display.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
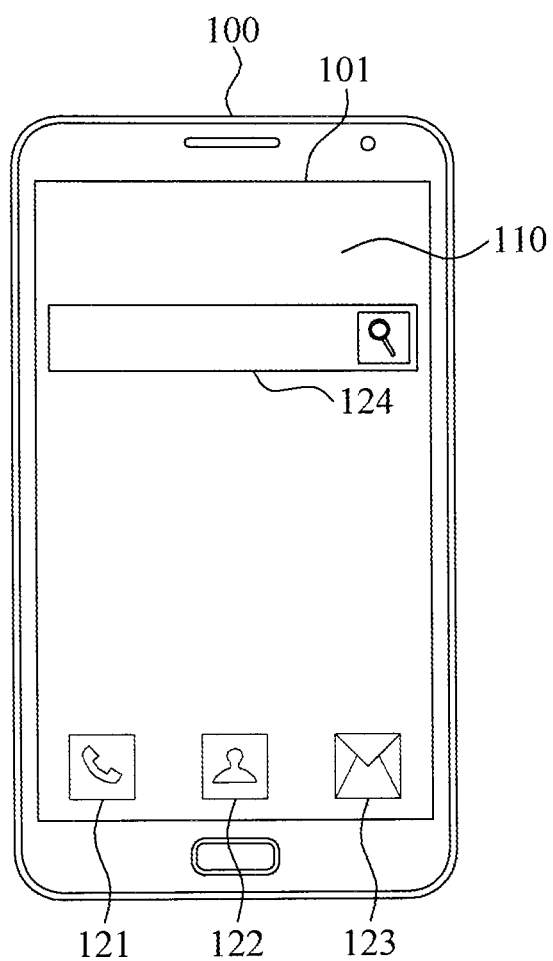
FIG. 1 is a diagram illustrating a device for displaying a background image according to at least some example embodiments.

Example embodiments will now be described more fully with reference to the accompanying drawings. Many alternate forms may be embodied and example embodiments should not be construed as limited to example embodiments set forth herein. In the drawings, like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., nonvolatile memories universal flash memories, universal flash memory controllers, nonvolatile memories and memory controllers, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

FIG. 1 is a diagram illustrating a device 100 for displaying a background image according to at least some example embodiments.

Referring to FIG. 1, the device 100 for displaying a background image may display a background image 110 and objects 121, 122, 123, and 124 through a display 101.

Hereinafter, in the present specification, the background image 110 is an image designated to be displayed as a background. For example, the background image 110 may include a still image, a movie, and a three-dimensional (3D) image. The still image is an image including a single frame, and may include a photo, and the like. The movie is an image including a plurality of frames, may be played by a processor. The 3D image may include a left image and a right image to provide a stereoscopic image to a user. In this example, the display 101 may provide the left image for a left eye and the right image for a right eye.

The background image 110 may be an image randomly designated by a user. Also, the background image 110 may be an image set as a default. Also, a background image may be provided as a lock screen.

Hereinafter, in the present specification, the objects 121, 122, 123, and 124 may be overlaid on the background image as elements distinguished from the background image. For example, the objects 121, 122, 123, and 124 may include icons 121, 122, and 123 to execute applications and a search bar widget 124. For example, with reference to FIG. 1, a first icon 121 may be an icon to execute a phone application, a second icon 122 may be an icon to execute a contact application, and a third icon 123 may be an icon to execute a text message application.

As used herein, overlaying may refer to an operation to display the objects 121, 122, 123, and 124 to obscure a partial region of the background image 110. For example, the operation to overlay the background image 110 by the objects 121, 122, 123, and 124, may refer to an operation to display an object layer displaying the objects 121, 122, 123, and 124 prior to a background layer displaying the background image 110. A detailed embodiment of overlaying will be provided with reference to FIGS. 9 and 10.

A common electronic device may provide a function to change a background image by a user. For example, the user may change the background image by photographing in person, and may change the background image by selecting a stored image from a photo gallery as the background image. The user may solely select the background image in a case in which a user is unable to view an arrangement of objects for example, icons and widgets. As a result, a region that the user desires to reveal in the background image may be obscured by the objects, and the objects and the background image may be displayed in a disharmonious manner. The user may acquire a desired background image through several attempts.

According to example embodiments, a user convenience may increase by enabling a user to easily photograph a background image and change an arrangement of an object.

Figure 2:
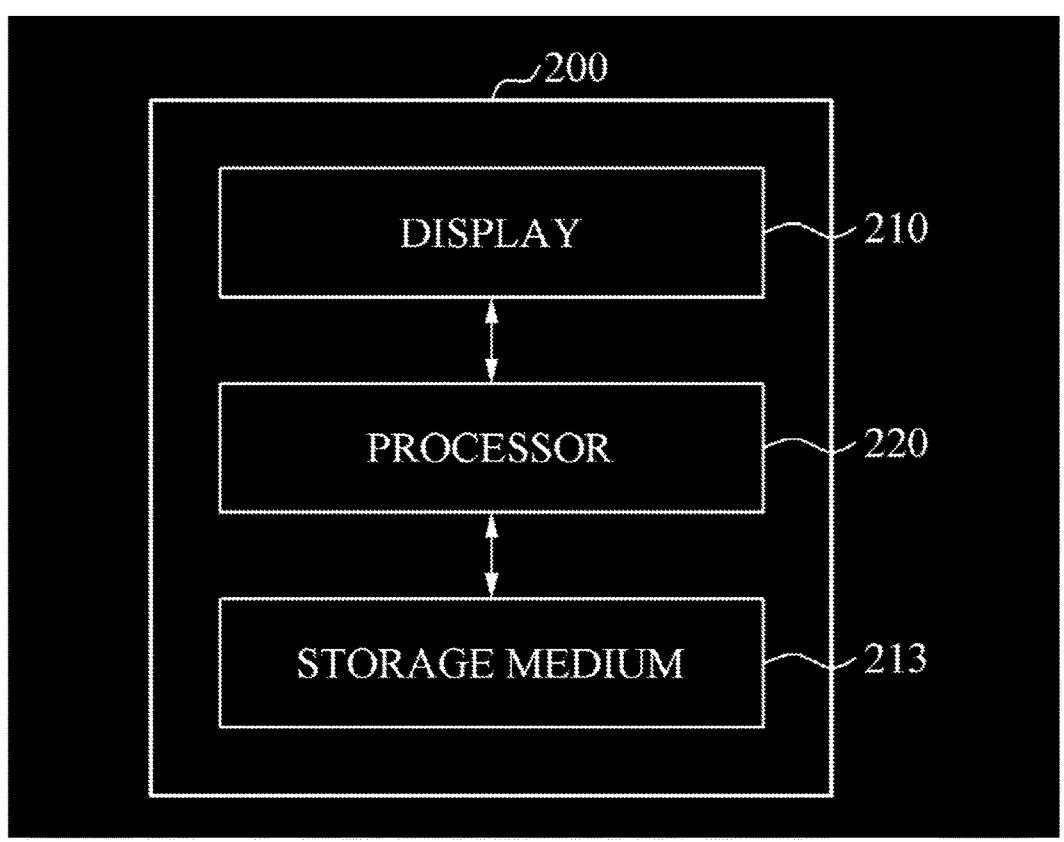
FIGS. 2 and 3 are block diagrams illustrating configurations of devices for displaying a background image according to at least some example embodiments.
Figure 3:
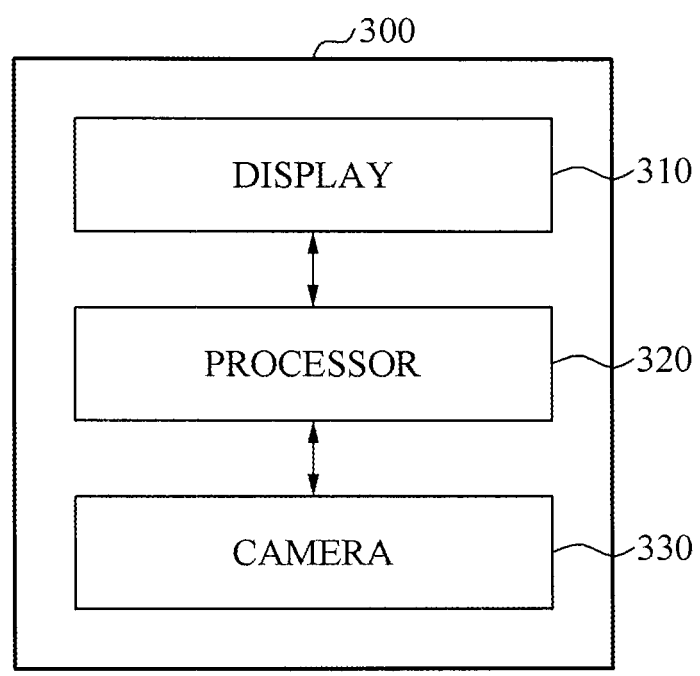

FIGS. 2 and 3 are block diagrams illustrating detailed configurations of devices 200 and 300 for displaying a background image according to at least some example embodiments.

Referring to FIG. 2, the device 200 for displaying a background image may include a display 210, a storage medium 213 and a processor 220.

The processor 220 may be hardware, firmware, hardware executing software or any combination thereof. When the processor 220 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the processor 220. As stated above, CPUs, DSPs, ASICs and FPGAs may generally be referred to as processing devices.

In the event where the processor 220 is a processor executing software, the processor 220 is configured as a special purpose machine to execute the software, stored in a storage medium 213, to perform the functions of the at least one of the processor 220.

The display 210 may display at least one object and a background image. For example, the display 210 may display at least one object based on an arrangement determined by the processor 220, and may display the background image to which a visual effect is applied.

Hereinafter, in the present specification, the visual effect may refer to all visual changes to be displayed in a background image in association with the background image or an object. For example, the visual effect may include a light source effect and a shadow formed by the light source effect.

For example, when a virtual light source is set in a background image, the visual effect may include the light source effect by the virtual light source. Hereinafter, in the present specification, the light source effect may refer to an effect of changing a brightness and a color of an adjacent region of the object in a background image.

For example, the visual effect may include a weakening effect, a highlighting effect, and the like with respect to a background image. The weakening effect is an image processing effect of deemphasizing an image. For example, the weakening effect may include blurring to limit a high-frequency component of the image to blur or soften the image. The highlighting effect is an image processing effect of emphasizing an image. For example, the highlighting effect may include a sharpening process to limit a low-frequency component of the image to sharpen the image.

The processor 220 may reflect the visual effect in a background image based on the background image. For example, the processor 220 may set the virtual light source based on the background image, and display an adjacent region of the object reflecting a visual effect by a virtual light source set based on the background image, through the display 210. A detailed description will be provided with reference to FIGS. 8 through 10.

The processor 220 may also change a level of the visual effect with respect to the adjacent region of the object while maintaining the visual effect with respect to the object in response to a brightness control signal of a user. For example, when the user feels that a shadow is excessively displayed, the user may change a level of the light source effect, through the brightness control signal.

The processor 220 may also determine an arrangement of the object based on a background image. For example, the processor 220 may relocate the object placed in a first region including a region of interest (ROI) to a second region distinguished from the first region. A detailed description will be provided with reference to FIGS. 12 and 13.

Referring to FIG. 3, the device 300 for displaying a background image may include a display 310, a processor 320, and a camera 330. For example, the display 310 and the processor 320 may be configured to operate similar to the display 210 and the processor 220 of FIG. 2, respectively. Thus, duplicated descriptions will be omitted for conciseness.

The camera 330 may receive an external image with respect to an external space of the device 300 for displaying a background image. The camera 330 may store the received external image as a photo or a movie in response to a control of a user. An arrangement of an object with respect to the external image received from the camera 330 will be described in detail with reference to FIGS. 16 and 17.

The device 300 for displaying a background image may be a portable electronic device to which a camera is attached, and may include, for example, a smartphone and a tablet personal computer (PC).

According to example embodiments, the device for displaying the background image may directly provide a user with an image in which an arrangement of an object in the background image is overlaid, so that the user may intuitively photograph the background image in which an ROI is not obscured by the object. Also, in a photographing process performed by the user, the arrangement of the objects may be changed based on a composition desired by the user.

Also, the device for displaying a background image may automatically arrange an object based on the ROI, and the like which exist in the background image, thereby generating and displaying the background image to visually harmonize the background image with the object desired by the user.

FIGS. 4 through 7 are flowcharts illustrating methods of displaying a background image according to at least some example embodiments.

Figure 4:
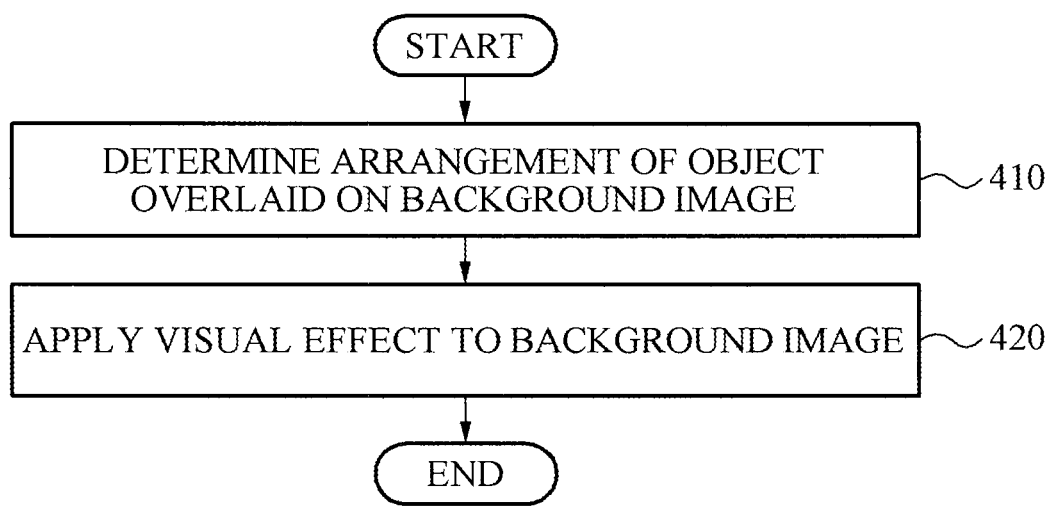
FIGS. 4 through 7 are flowcharts illustrating methods of displaying a background image according to at least some example embodiments.

FIG. 4 is a flowchart illustrating a method of determining an arrangement of an object and displaying a background image to which a visual effect is applied.

Referring to FIG. 4, in operation 410, a processor may determine an arrangement of an object to be overlaid on a background image. For example, the processor may determine the arrangement of the object based on image information associated with the background image. A process of changing the arrangement of the object will be described in detail with reference to FIGS. 12 and 13.

Hereinafter, in the present specification, the image information may include brightness information, color information, and the like in association with an image. The brightness information is associated with a brightness of the image. The brightness information may include a brightness distribution in the image, a brightness value of a random location in the image, and the like. The color information is associated with a color of the image. The color information may include a color distribution in the image, and a color value of a random location in the image, and the like.

In operation 420, the processor may apply the visual effect to the background image. For example, the processor may reflect the visual effect in the background image based on at least one of the background image and the object, and control the display to display the background image to which the visual effect is applied.

Figure 5:
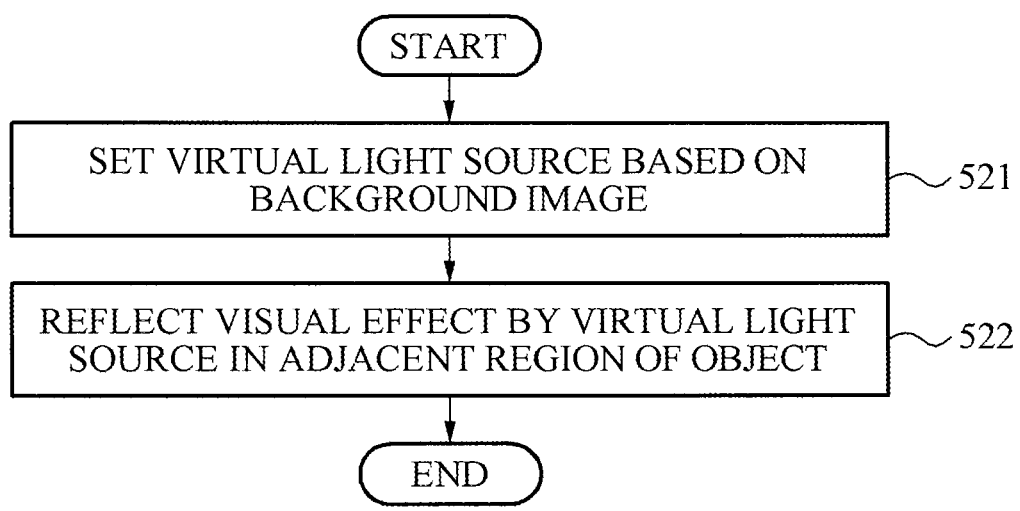

FIG. 5 is a flowchart illustrating a method of applying a visual effect by a virtual light source according to at least some example embodiments.

For example, a device for displaying a background image may create a background image which is harmonized with an object, by applying the visual effect with respect to the object based on image information associated with the background image.

Referring to FIG. 5, in operation 521, the processor may set the virtual light source based on the background image. For example, the processor may set the virtual light source, based on the image information associated with the background image. Here, the processor may determine a location, a color, and a light intensity of the virtual light source. A detailed description will be provided with reference to FIGS. 8 through 11.

However, example embodiments are not limited to the foregoing. When a user designates a random region of a background image, the processor may set a virtual light source in the selected region in response to the designation of the user. For example, the user may select the random region by a touch action, or may select the random region by an action of drawing a shape of a closed curve.

In operation 522, the processor may reflect the visual effect by the virtual light source in an adjacent region of an object. For example, the processor may display a shadow formed by the virtual light source, as the visual effect with respect to the adjacent region of the object. Here, the processor may determine a color of the shadow based on a color of the virtual light source and a color of reflected light with respect to the object from the virtual light source.

Hereinafter, in the present specification, the reflected light with respect to the object from the virtual light source may refer to a light projected from a direct light, for example, the virtual light source, and reflected by the object. For example, a color of the object itself may be reflected in the color of the reflected light.

According to example embodiments, the processor may maintain a visual effect with respect to an object, and may change the visual effect with respect to the adjacent region of the object based on a virtual light source.

Figure 6:
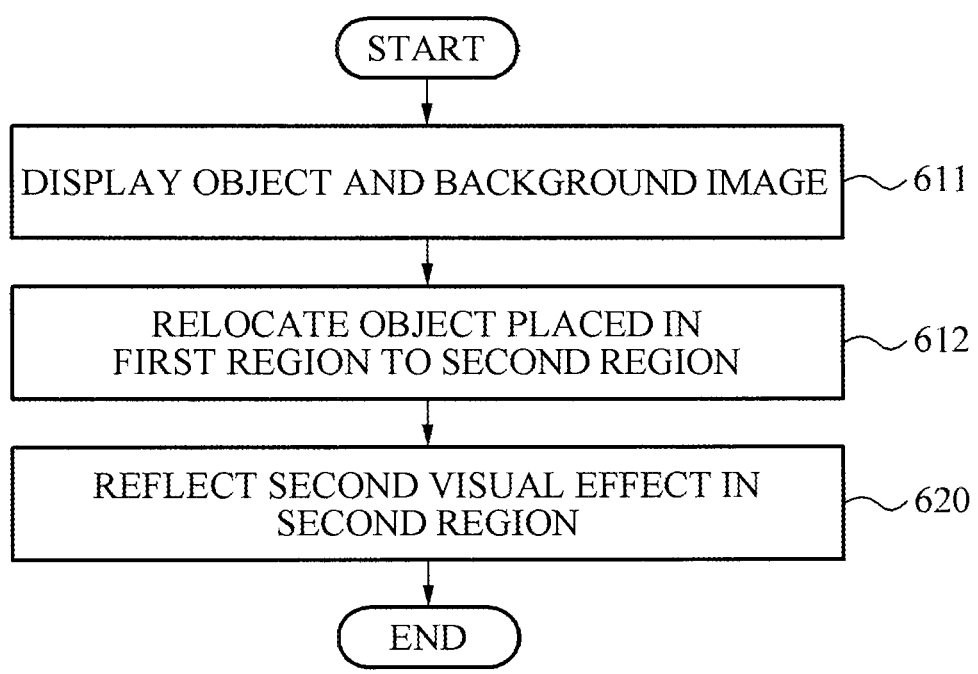

FIG. 6 is a flowchart illustrating a method of determining an arrangement of an object and reflecting a visual effect in a background image according to at least some example embodiments.

Referring to FIG. 6, in operation 611, a processor may display the object and the background image through a display. For example, the processor may display the object by overlaying the object on the background image.

In operation 612, the processor may relocate the object placed in a first region to a second region. For example, the processor may change a location of the object placed in the first region among at least one object to the second region distinguished from the first region in the background image.

The processor may determine the first region and the second region in the background image based on image information associated with the background image. The detailed description of the first region and the second region will be provided with reference to FIGS. 12 and 13.

In operation 620, the processor may display the second region reflecting a second visual effect. For example, the processor may reflect a weakening effect, as the second visual effect, in the second region. The detailed description of the region reflecting the second visual effect will be provided with reference to FIGS. 14 and 15. The second visual effect is not limited to the weakening effect, and other visual effects may be applied to the second visual effect.

Figure 7:
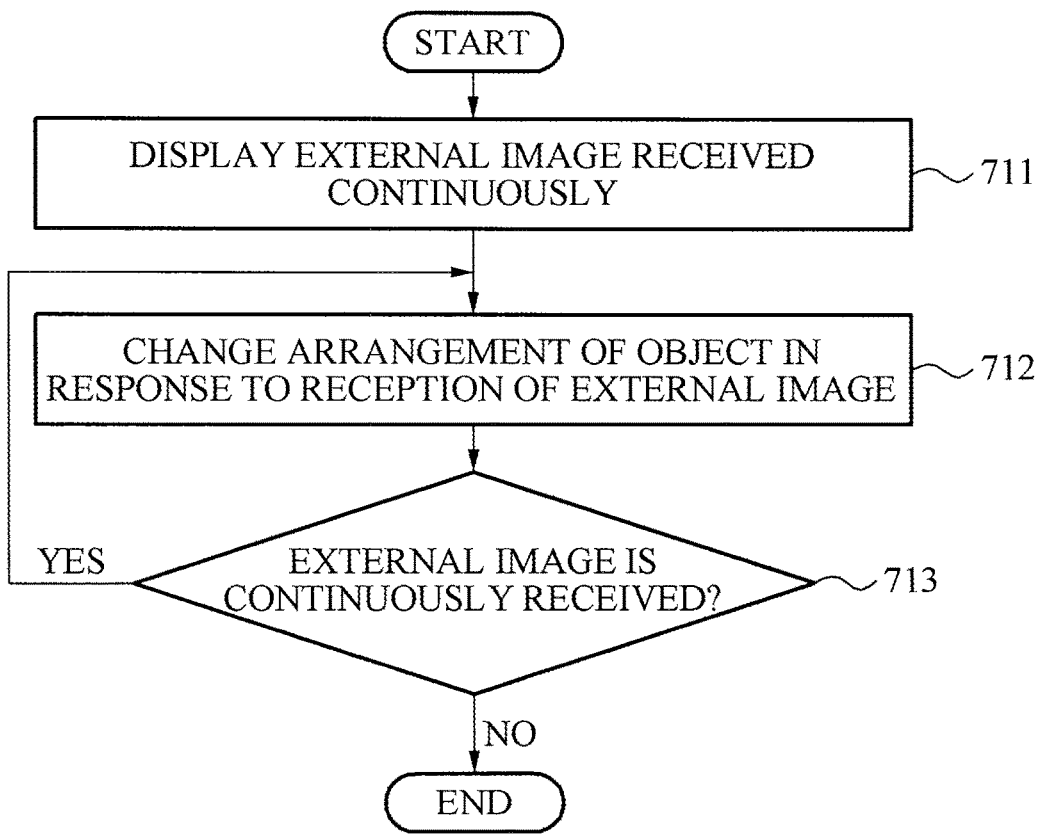

FIG. 7 is a flowchart illustrating a method of determining an arrangement of an object in response to a reception of an external image according to at least some example embodiments.

Referring to FIG. 7, in operation 711, a processor may display, through a display, an external image received continuously. For example, the processor may receive the external image through a camera. Also, when an external location to be photographed by the camera is changed, the processor may change the external image to be displayed in response to the change of the external location.

In operation 712, the processor may change an arrangement of the object in response to a reception of the external image. For example, the processor may identify a first region from the external image based on the image information associated with the external image, and may change a location of the object placed in the first region among at least one object to the second region distinguished from the first region in real time.

In operation 713, the processor may determine whether the external image is continuously received. When the processor determines the external image is continuously received, the processor may repeat operation 712. Until the reception of external image is suspended, the processor may change the arrangement of the object based on the received external image in real time. The detailed description will be provided with reference to FIGS. 16 and 17.

For example, the processor may suspend the reception of the external image in response to a control signal of a user. Here, the control signal is a signal to control the reception of the external image. The control signal may include a command to photograph the external image corresponding to the external space through a camera, and a command to store the photographed external image. The processor may store the photographed external image as a background image.

According to example embodiments, while a user is controlling a camera in order to photograph a portion of an external space, a processor may determine an arrangement of an object in real time based on the external image corresponding to the portion of the external space. The processor may store the external image as the background image in response to a control signal of the user, and may display the stored external image through the display.

Further, when the arrangement of the object is determined, the processor may set a virtual light source with respect to the external image based on image information associated with the external image, and may display an adjacent region of each of at least one object reflecting a light source effect by the virtual light source.

FIGS. 4 through 7 may be performed independently, and may be performed by combining at least two example embodiments.

Figure 8:
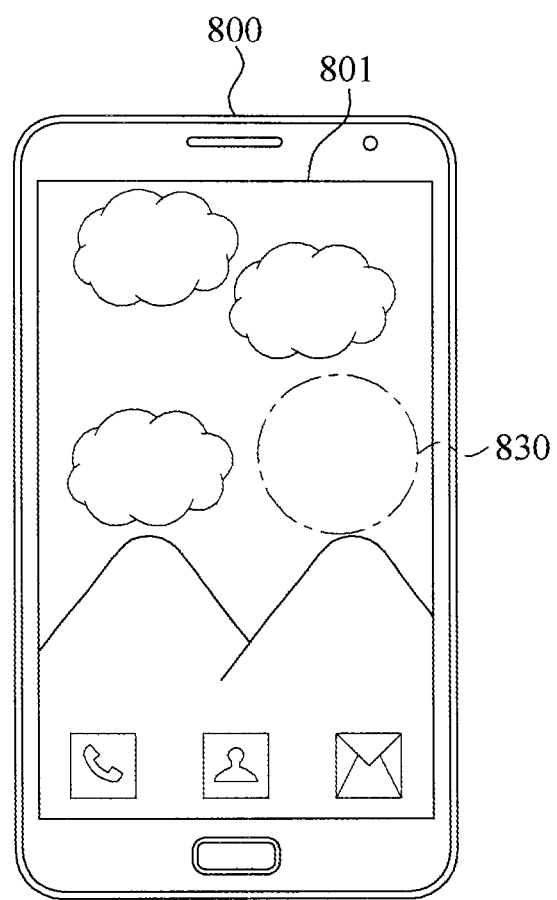
FIGS. 8 through 10 are diagrams illustrating examples of set virtual light sources according to at least some example embodiments.
Figure 9:
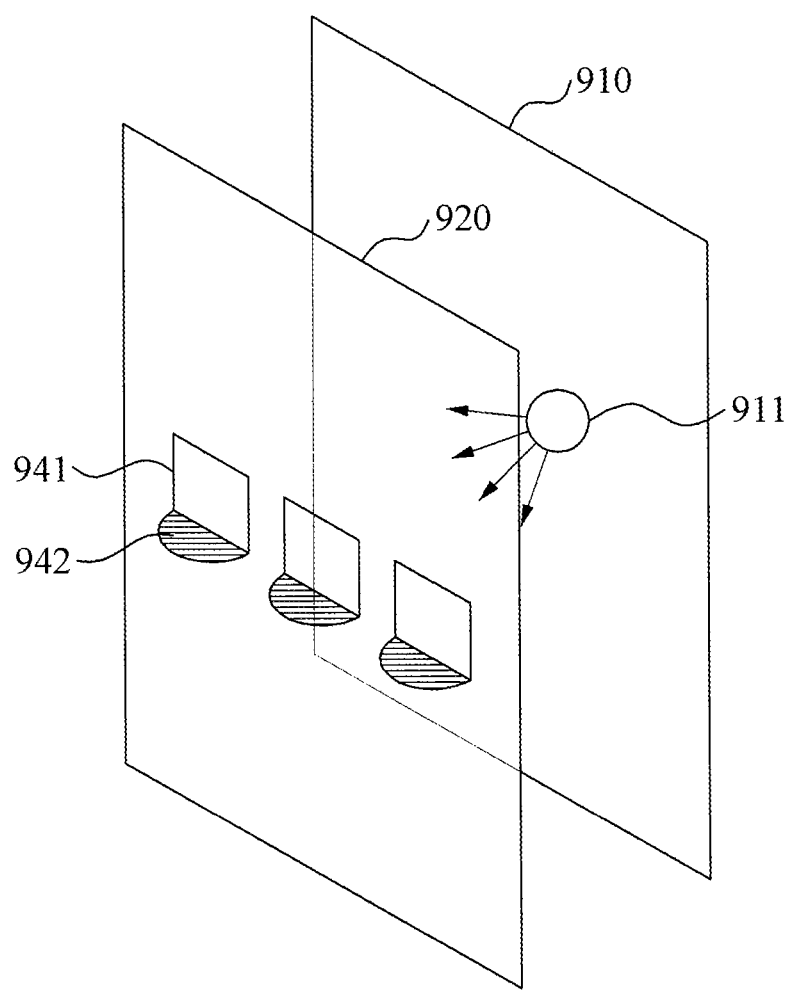
Figure 10:
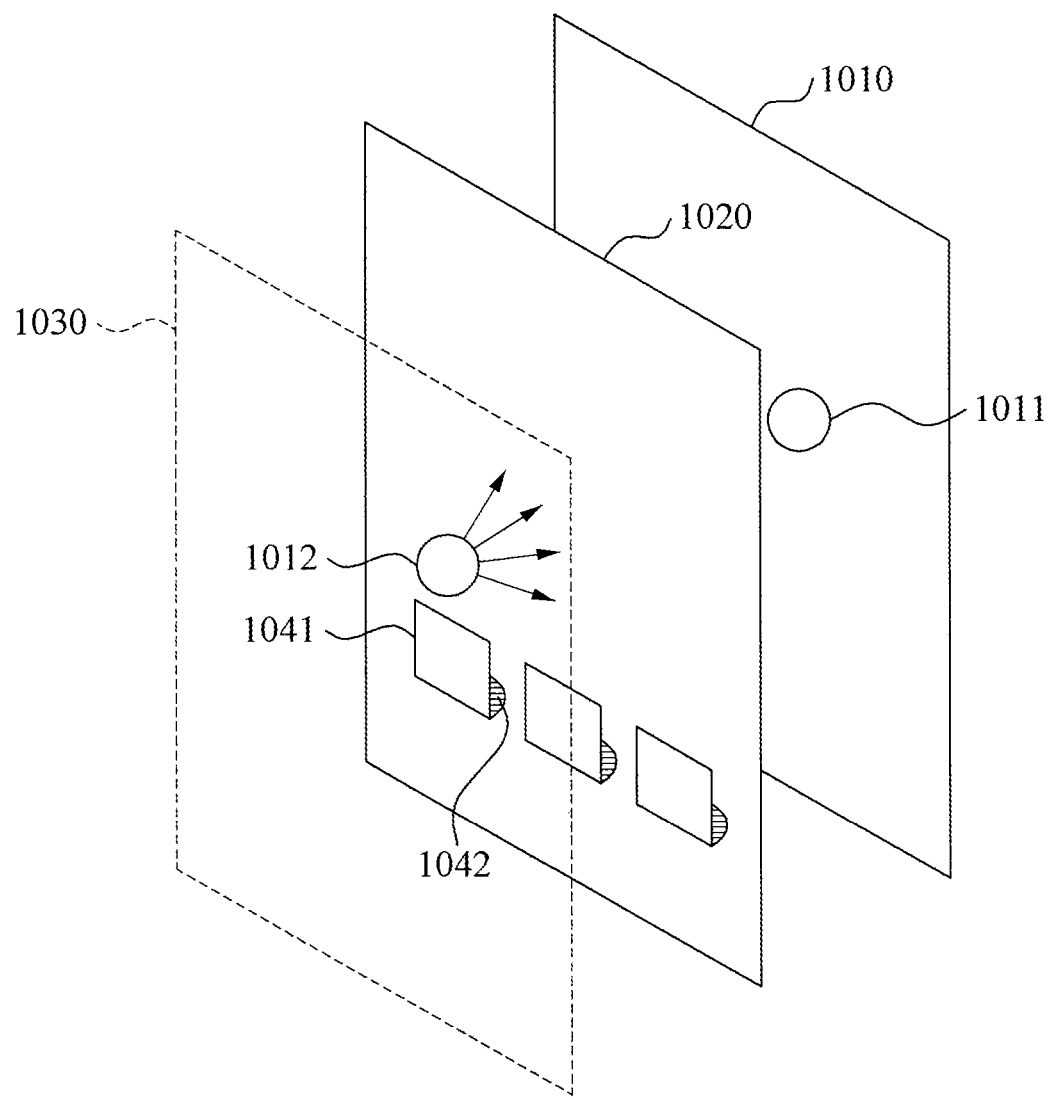

FIGS. 8 through 10 are diagrams illustrating examples of set virtual light sources according to at least some example embodiments.

FIG. 8 is a diagram illustrating an example of a location 830 of a virtual light source set in a background image.

Referring to FIG. 8, a device 800 for displaying a background image may display objects and a background image through a display 801. A processor of the device 800 for displaying a background image may set the virtual light source based on image information associated with the background image.

The processor may determine a location of the virtual light source based on brightness information associated with a background image. For example, as shown in FIG. 8, the processor may determine a region including the brightest pixel for example, a pixel of which a brightness value is a maximum in the background image, as a first region. The processor may locate the virtual light source in a portion of the first region, set a plurality of virtual light sources in the first region, or set the entire first region as the virtual light source.

The processor may extract a color of the virtual light source from a location corresponding to the virtual light source in a background image, and may display a visual effect using the extracted color. For example, the processor may extract the color of the virtual light source based on color information associated with a first region of a background image. The processor may determine a color of the virtual light source based on a statistical value for example, a median value, an average value, and the like of color values of pixels located in the first region of the color information associated with the first region.

The processor may determine a light intensity of the virtual light source from a location corresponding to the virtual light source in the background image. For example, the processor may determine the light intensity of the virtual light source based on the brightness information associated with the first region of the background image. The processor may determine the light intensity of the virtual light source based on a statistical value for example, a median value, an average value, and the like of brightness values of pixels located in the first region of the brightness information associated with the first region.

According to example embodiments, when a background image includes a plurality of frames, the processor may play the plurality of frames continuously and change the visual effect by the virtual light source with respect to the adjacent region of the object for each frame.

FIG. 9 is a diagram illustrating an example in which a virtual light source is set on a background layer according to at least some example embodiments.

Referring to FIG. 9, a background layer 910 may refer to a layer on which a background image is displayed by a processor. The processor may set a virtual light source 911 on a background image similar to the aforementioned FIG. 8. For example, a location of the virtual light source 911 illustrated in FIG. 9 may correspond to the location 830 of the virtual light source illustrated in FIG. 8.

An object layer 920 may refer to a layer on which an object 941 is displayed by the processor. Referring to FIG. 9, the object layer 920 may be located in front of the background layer 910. For example, the background layer 910 may be set to be at a predetermined and/or desired distance spaced apart from the object layer 920.

According to at least some example embodiments, the processor may reflect a visual effect by the virtual light source 911 set on the background layer 910, in an adjacent region of the object 941 of the object layer 920. For example, a shadow 942 formed by a light source effect by the virtual light source 911 may be displayed in the adjacent region of the object 941. Here, an area, a color, a brightness, and the like of the shadow 942 may be determined based on a distance between the virtual light source 911 and the object 941, a color of the virtual light source 911, a light intensity of the virtual light source 911, and the like.

FIG. 10 is a diagram illustrating an example in which a virtual light source 1012 is set on a virtual layer 1030.

Referring to FIG. 10, the virtual layer 1030 may refer to a layer to be set to designate a location of the virtual light source 1012 by a processor. The virtual layer 1030 may be set to be at a predetermined at least some distance spaced apart from an object layer 1020. For example, a distance among the virtual layer 1030, the object layer 1020, and a background layer 1010 may be set at equal intervals. However, the distance among the virtual layer 1030, the object layer 1020, and the background layer 1010 is not limited to equal intervals, and may be set at varying intervals.

The processor may set the virtual light source 1012, in order for a location of the virtual light source 1012 on the virtual layer 1030 to correspond to a first region 1011 on the background layer 1010 for example, the region of which a brightness value is the highest on the background image. Also, the processor may determine the first region 1011 on the background layer 1010 similar to the aforementioned FIG. 8.

According to at least some example embodiments, the processor may reflect a visual effect by the virtual light source 1012 set on the virtual layer 1030, in an adjacent region of an object 1041 of the object layer 1020. For example, a shadow 1042 formed by a light source effect by the virtual light source 1012 may be displayed in the adjacent region of the object 1041. Here, the processor may display the shadow 1042 formed in an opposite direction from FIG. 9.

The processor may control the display to display only the visual effect by the virtual light source 1012, not to display the virtual layer 1030 and the virtual light source 1012 set on the virtual layer 1030.

Figure 11:
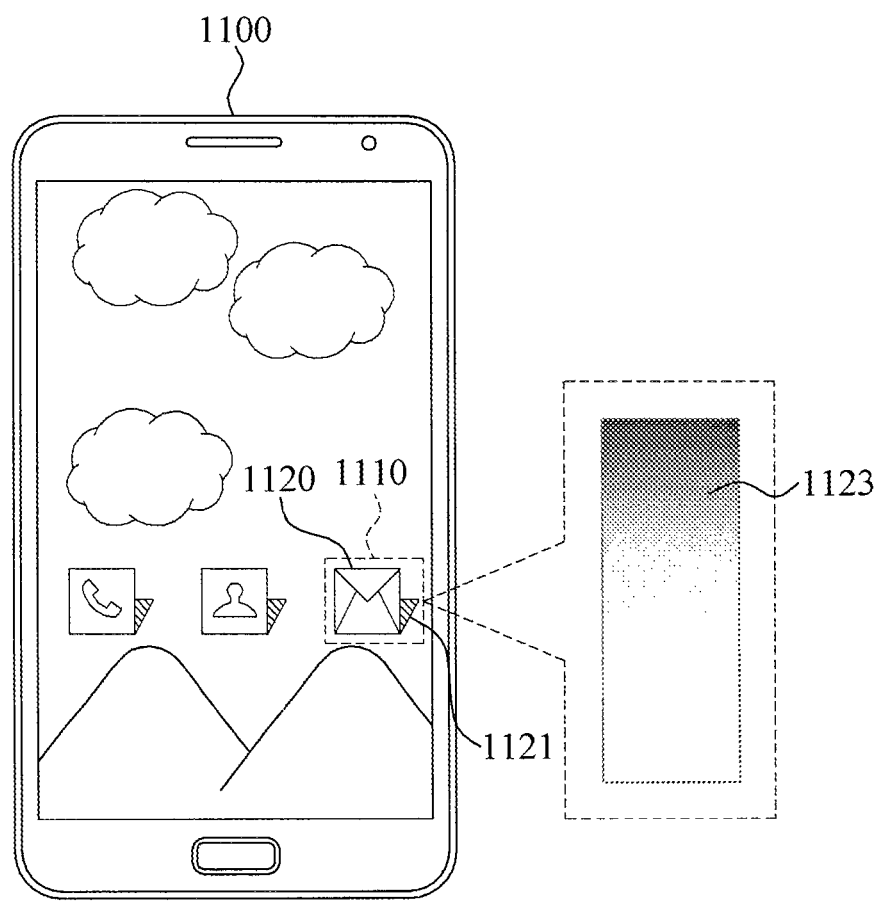
FIG. 11 is a diagram illustrating an example of a visual effect by a set virtual light source according to at least some example embodiments.

FIG. 11 is a diagram illustrating an example of a visual effect of a set virtual light source according to at least some example embodiments.

Referring to FIG. 11, according to at least some example embodiments, the virtual effect by the virtual light source may include a shadow 1121 formed by a light projected from the virtual light source toward an object 1120. An area, a color, a brightness, and the like of the shadow 1121 may be determined based on a distance between the virtual light source and the object 1120, a color of the virtual light source, a light intensity of the virtual light source, and the like. For example, the processor may designate the virtual light source in the brightest region of the background image.

A processor of a device 1100 for displaying a background image may display a region having a relatively high brightness in the background image with a relatively dark or wide shadow 1121, and may display a region having a relatively low brightness in the background image with a relatively pale or narrow shadow 1121, based on brightness information of the background image for example, a level of high and low brightness.

The processor may determine a color of the shadow 1121 based on a color of the virtual light source and a color of a reflected light. The color of the reflected light may refer to a color of a light reflected by an object 1120 and projected from the virtual light source. For example, the color of the shadow 1121 may be a color which is a mixture of the color of the virtual light source and the color of the reflected light.

Also, the processor may display a light source effect by an indirect light source by extracting the color of the shadow 1121 based on a color of an object adjacent region 1110 in the background image. For example, the processor may display a gradation of the shadow 1121 based on a brightness graph 1123 corresponding to the color of the object adjacent region 1110.

Figure 12:
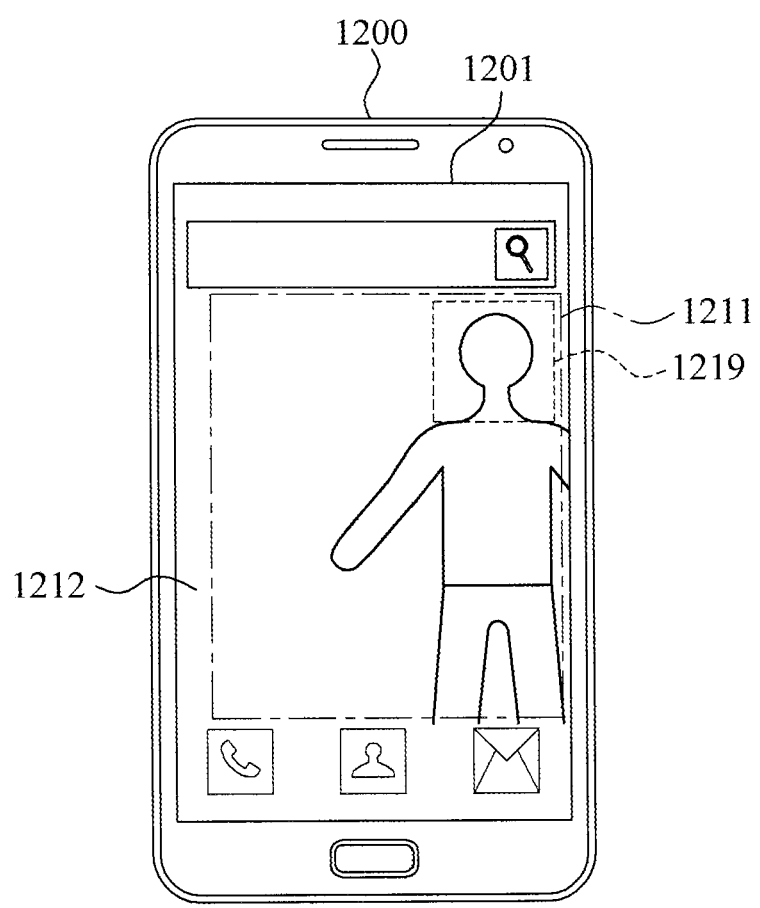
FIG. 12 is a diagram illustrating an example of changing an arrangement of an object based on a background image according to at least some example embodiments.

FIG. 12 is a diagram illustrating an example of changing an arrangement of an object based on a background image according to at least some example embodiments.

Referring to FIG. 12, a device 1200 for displaying a background may display the object in basically the same arrangement as FIG. 1. When a first region 1211 is determined with respect to the background image, the processor may change the arrangement of the object on a display 1201.

The processor may determine a partial region of the background image as the first region 1211 based on image information associated with the background image. The single first region 1211 and the single second region 1212 are illustrated in FIG. 12. However, each of the first region 1211 and the second region 1212 is not limited to a single region, but may be set as a plurality of regions.

The processor may identify an ROI 1219 from the background image, and may determine a region including the identified ROI 1219 as the first region 1211. The processor may determine a remaining region distinguished from the first region 1211 in the background image as the second region 1212.

The ROI 1219 is a region that a user desires not to be obscured in the background image. For example, the ROI 1219 may include a region indicating a body of a person, a face of a person, a specific object, and the like. For example, when the ROI 1219 includes a face of a person, the processor may identify the ROI 1219 through a facial recognition.

The processor may determine the first region 1211 based on color information, brightness information, and the like from the background image. For example, when the first region 1211 is determined based on the color information, the processor may determine a region including a large amount of a specific range of color value in the background image, as the first region 1211. Also, when the first region 1211 is determined based on the brightness information, the processor may determine a region including a large amount of a specific range of brightness value in the background image, as the first region 1211.

However, the first region 1211 is not limited to be set automatically at all times. The first region 1211 may be designated randomly by a user. For example, the user may select the first region 1211 by a touch action, or may select a specific region of a background image by an action of drawing a shape of a closed curve. Also, when the processor selects the first region 1211, the user may manually adjust and modify the first region 1211.

According to at least some example embodiments, the processor may change a location of the object placed in the first region 1211 among the object to the second region 1212 distinguished from the first region 1211 in the background image. For example, the processor may change an arrangement of a widget object to a location illustrated in FIG. 12, so that the widget object 124 illustrated in FIG. 1 is not located in the first region 1211. As a result, the widget object may be relocated to the upper side than the widget object 124 illustrated in FIG. 1, not to obscure the ROI 1219.

However the arrangement of the object is not limited to be determined automatically, but may be determined randomly by a user. Also, when the processor automatically determines the arrangement of the object, the processor may enable a user to modify the arrangement of the object by providing an automatic arrangement result. Also, the object may be rearranged automatically based on a choice of the user.

Figure 13:
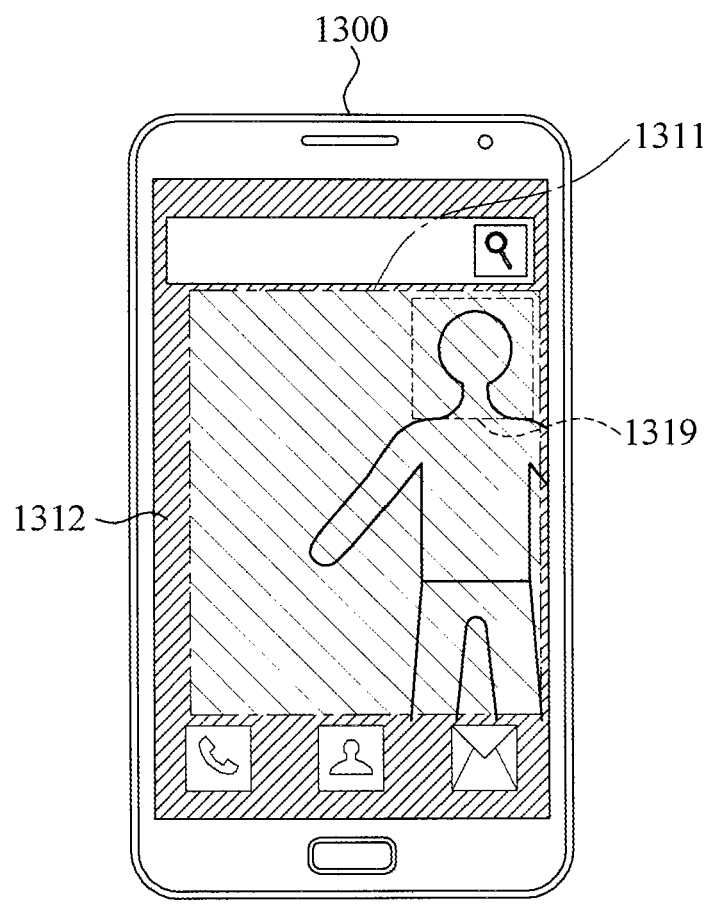
FIG. 13 is a diagram illustrating an example of a first visual effect and a second visual effect with respect to a first region and a second region, respectively, in a background image according to at least some example embodiments.

FIG. 13 is a diagram illustrating an example of a first visual effect and a second visual effect with respect to a first region and a second region, respectively, in a background image according to at least some example embodiments.

Referring to FIG. 13, in a device 1300 for displaying a background image, an ROI 1319, a first region 1311, and a second region 1312 illustrated in FIG. 13 may be determined as described in FIG. 12.

The processor may apply a first visual effect to the first region 1311, and may apply a second visual effect to the second region 1312. The first visual effect and the second visual effect may represent different visual changes. For example, the processor may display the first region 1311 reflecting a first visual effect distinguished from the second visual effect.

The first visual effect may refer to an effect of highlighting a background image corresponding to the first region 1311. For example, the processor may perform a sharpening with respect to the first region 1311 including the ROI 1319 to highlight the ROI 1319 for example, a region including a face.

The second visual effect may refer to an effect of weakening the background image corresponding to the second region 1312. For example, the processor may perform a blurring with respect to the second region 1312 to emphasize objects in the second region 1312. A detailed application of the second visual effect will be described with reference to FIGS. 14 and 15.

Figure 14:
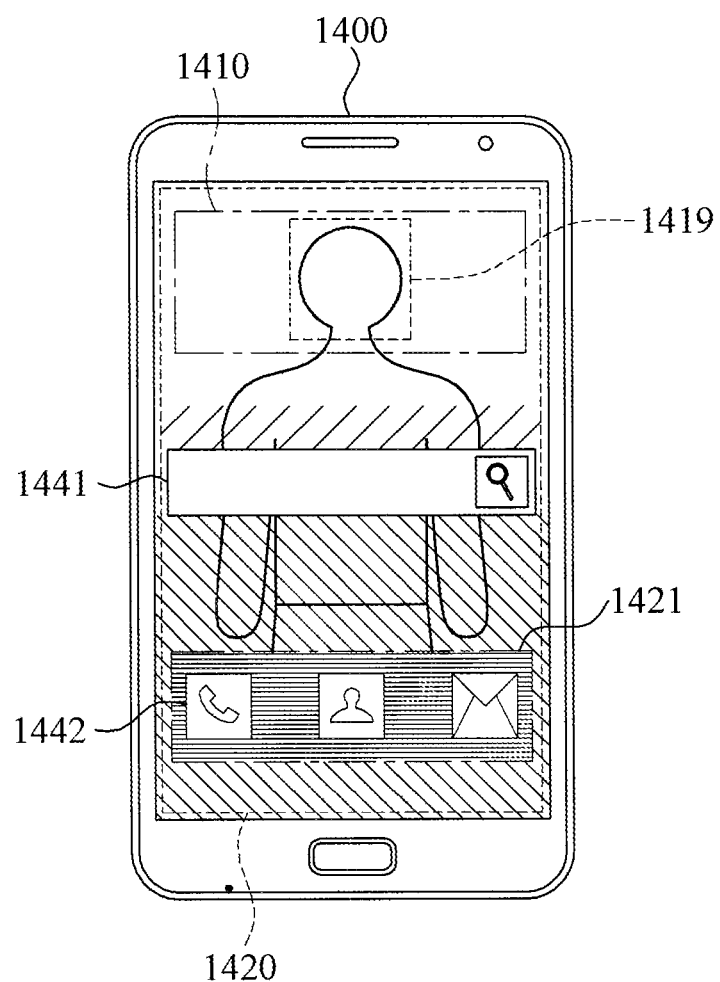
FIGS. 14 and 15 are diagrams illustrating examples of levels of a second visual effect to be reflected in a second region on a background image according to at least some example embodiments.
Figure 15:
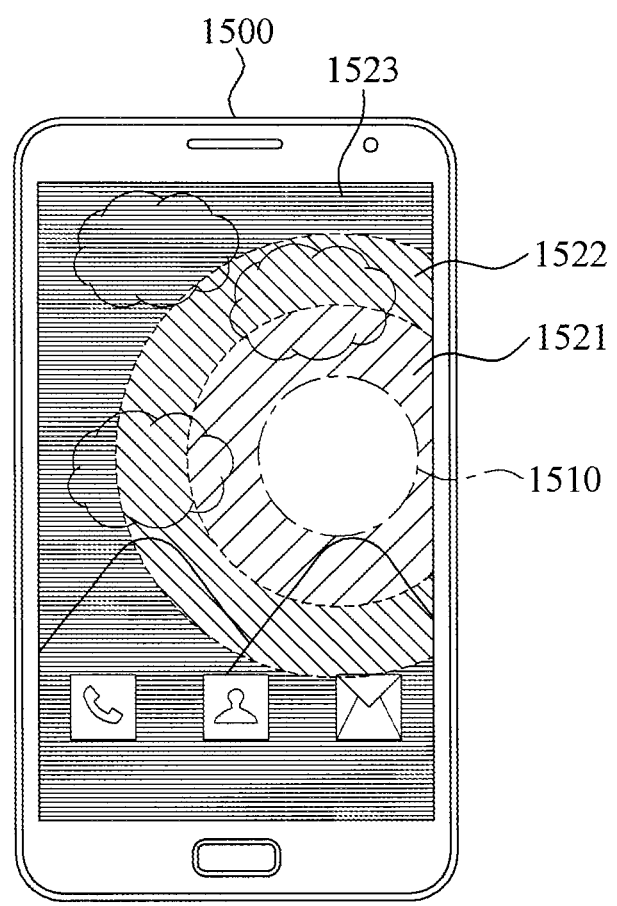

FIGS. 14 and 15 are diagrams illustrating examples of levels of a second visual effect to be reflected in a second region on a background image according to at least some example embodiments.

Referring to FIG. 14, a processor may determine a level of the second visual effect with respect to a second region 1420 based on an arrangement of an object 1441 in the second region.

A device 1400 for displaying a background image may determine a first region 1410 and the second region 1420 based on an ROI 1419 of the background image for example, a face of a person, a face of a pet, and the like, and determine an arrangement of objects 1441 and 1442 to place all the objects 1441 and 1442 in the second region 1420.

The processor may differently reflect a level of the second visual effect based on the arrangement of the objects in the second region 1420. For example, with reference to FIG. 14, the processor may apply a high level of the second visual effect to a region 1421 where the objects 1442 are concentrated. The processor may apply a high level of a weakening effect for example, a blurring, to the region 1421 where the objects 1442 are concentrated, and thus a visibility with respect to the objects 1442 by a user may be enhanced.

Referring to FIG. 15, a processor may determine a level of a second visual effect with respect to a second region based on a distance from a first region to the second region.

A device 1500 for displaying a background image may determine a first region 1510 and second regions 1521, 1522, and 1523 based on image information associated with a background image. The processor may differently apply a level of the second visual effect based on distances from the first region 1510 to the second regions 1521, 1522, and 1523. For example, with reference to FIG. 15, the processor may apply a relatively low level of the second visual effect to the second region 1521 close to the first region 1510, an intermediate level of the second visual effect to the second region 1522 placed at an intermediate distance from the first region 1510, and a relatively high level of the second visual effect to the second region 1523 far from the first region 1510.

A level of reflection of the second visual effect is described as a discontinuous level. However, the level of reflection of the second visual effect is not limited to the discontinuous level. The processor may determine the level of the second visual effect to change continuously based on a distance from the first region 1510.

Figure 16:
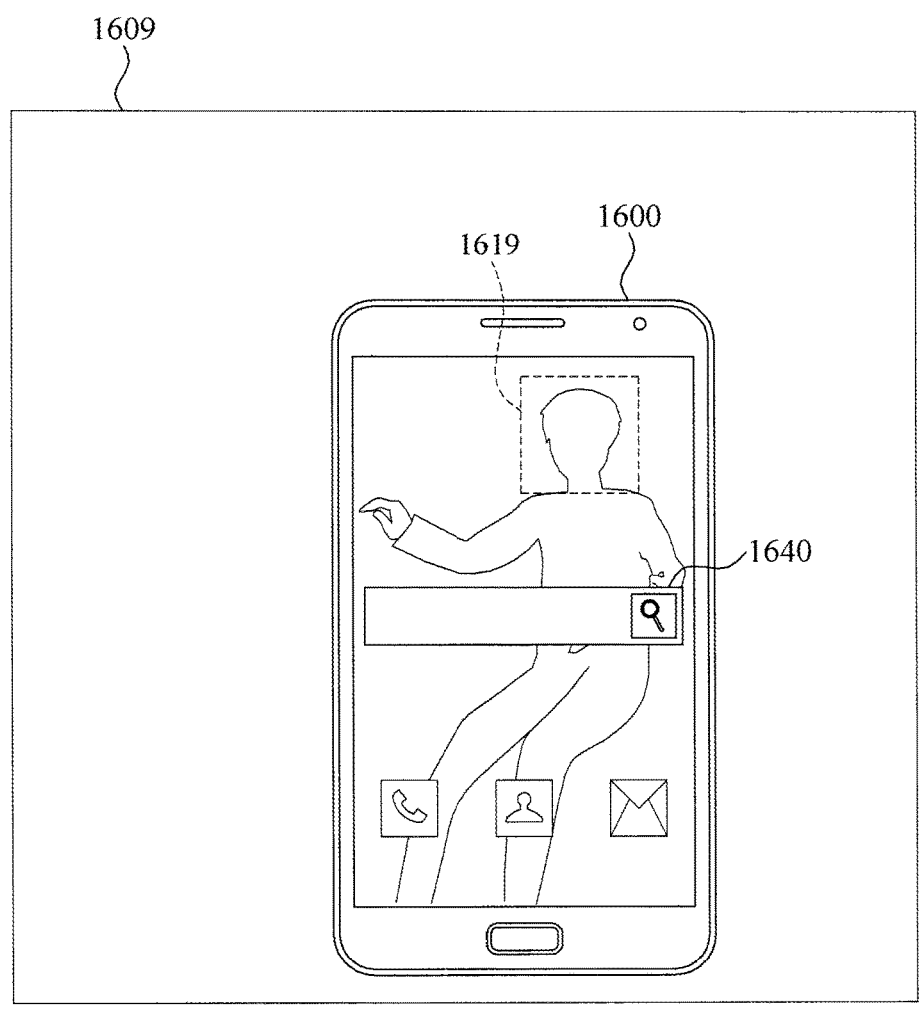
FIGS. 16 and 17 are diagrams illustrating examples of processes for determining an arrangement of an object in response to a reception of an external image according to at least some example embodiments.
Figure 17:
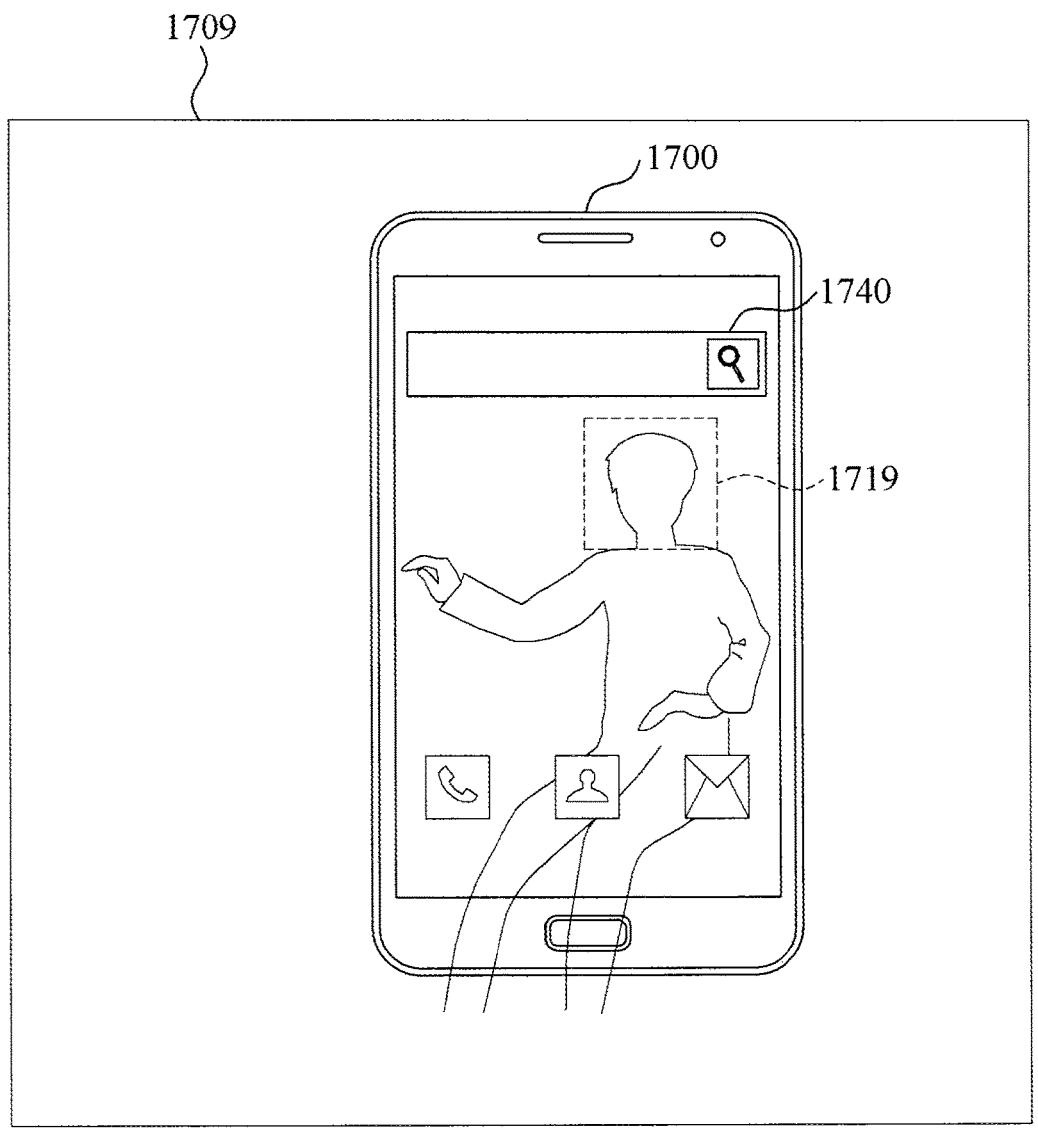

FIGS. 16 and 17 are diagrams illustrating examples of processes for determining an arrangement of an object in response to a reception of an external image according to at least some example embodiments.

Referring to FIG. 16, a device 1600 for displaying a background image may change an arrangement of an object 1640 in real time while the device continuously receives an external image. The device 1600 for displaying a background image may display the object 1640 by overlaying the object 1640 with respect to the external image, while the device continuously receives the external image.

A processor may determine a region including an ROI 1619 from the external image as a first region, and may determine the remaining region distinguished from the first region as a second region.

While the external image is continuously received, the processor may identify the first region in real time from the external image, and may relocate the object 1640 located in the first region, to the second region.

For example, while a user photographs an external region 1609 through a camera, the external image may be displayed. The device 1600 for displaying a background image may change a location of a person to be displayed, based on an operation of a user. Referring to FIG. 16, a person may be displayed on the upper side. Referring to FIG. 17, a person may be displayed on the lower side.

A device 1700 of FIG. 17 is configured to display an object 1740 and an ROI 1719 similar to the device 1600 of FIG. 16, and the device 1700 may photograph an external region 1709 similar to the device 1600 of FIG. 16.

In response to the reception of the external image, the object 1640 of FIG. 16 may be located on the downside not to obscure the ROI 1619 of FIG. 16, and the object 1740 of FIG. 17 may be located on the upper side not to obscure the ROI 1719 in FIG. 17.

In response to a control signal of a user, the processor may store the external image with the aforementioned arrangement of the object, as a background image. The processor may store the external image reflecting at least one of the first visual effect with respect to the first region and the second visual effect with respect to the second region, as a background image.

The user may determine a background image and an arrangement of object while viewing the overlaid object. Therefore, the device for displaying a background image may store and display a background image with an optimal composition, while preventing a portion the user desires to reveal from being obscured by the object.

However, with reference to the aforementioned examples, an application of a visual effect with respect to a background image and a relocation of object are not limited to be performed automatically at all times. The application of the visual effect with respect to the background image and the relocation of object may be randomly performed or may not be performed according to a choice of the user. For example, the user may store an external image photographed without any processing, as a background image. Also, when the user designates a random region as an ROI, the device for displaying a background image may automatically change the arrangement of the object, not to obscure the ROI.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

According to the above-described exemplary embodiment of the present invention may be recorded in computer-readable media including program instructions to implement various operations embodied by a computer. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Thus, other implementations, alternative embodiments and equivalents to the claimed subject matter are construed as being within the appended claims.

What is claimed is:

1. A device for displaying a background image, the device comprising:
    a display configured to display an object and the background image; and
    a processor configured to instruct the display to display a shadow formed by a virtual light source at an adjacent region of the object based on the background image, wherein the processor is configured to extract a color of the virtual light source from a location corresponding to the virtual light source in the background image, to instruct the display to display the shadow using the extracted color, determine a region having a brightest pixel in the background image and to determine a location of the virtual light source in the region having the brightest pixel to be on a virtual layer at a distance from an object layer and the object layer includes the object.

2. The device of claim 1, wherein the processor is configured to set the virtual light source based on image information associated with the background image.

3. The device of claim 1, wherein the processor is configured to determine the color of the shadow based on at least one of the color of the virtual light source and a color of light reflected by the object from the virtual light source.

4. The device of claim 1, wherein the processor is configured to play a plurality of frames continuously and to change the shadow formed by the virtual light source with respect to the adjacent region of the object for each frame if the background image includes the plurality of frames.

5. The device of claim 1, wherein the processor is configured to maintain the shadow with respect to the object and to change the shadow with respect to the adjacent region of the object based on the virtual light source.

* * * * *